May 13, 1958
B. W. MILLER
2,834,088
COMBINED MOLD AND RACK
Filed Dec. 16, 1955
2 Sheets-Sheet 1
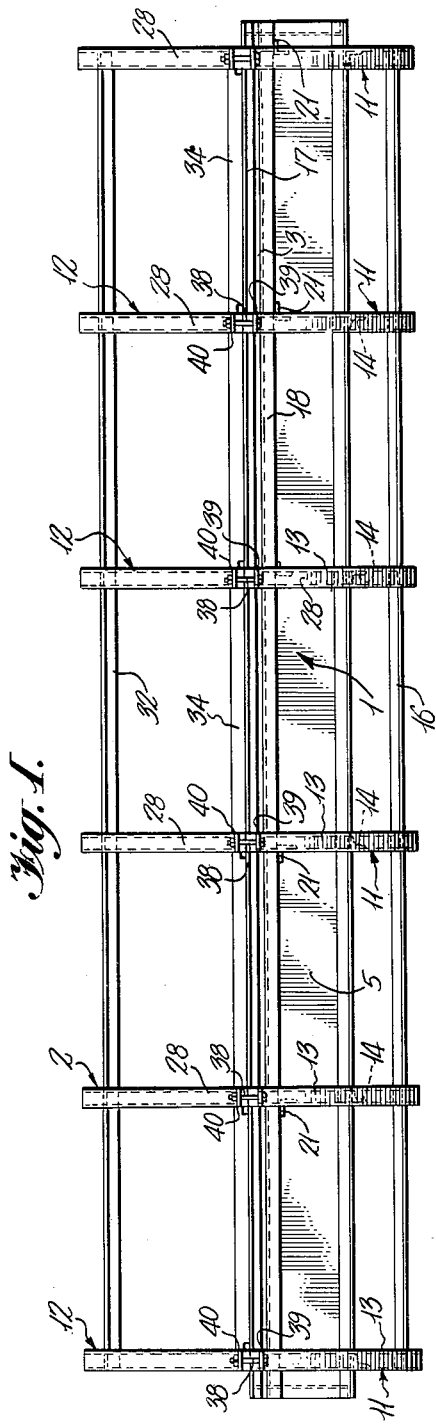
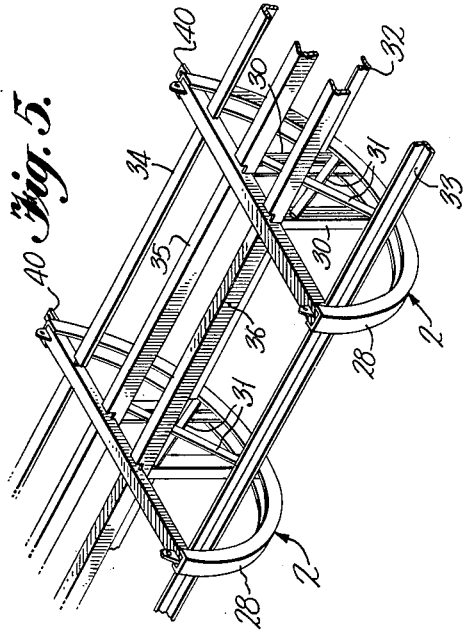
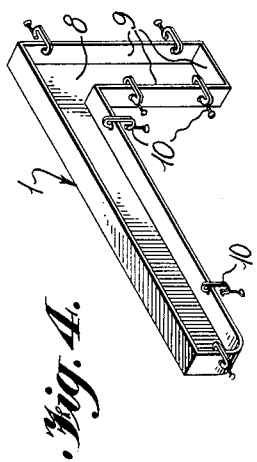
INVENTOR
*Buel Miller*
BY *Mason, Fenwick & Lawrence*
ATTORNEYS May 13, 1958  B. W. MILLER  2,834,088
COMBINED MOLD AND RACK
Filed Dec. 16, 1955  2 Sheets-Sheet 2

INVENTOR
Burel Miller
BY
Mason, Fenwick & Lawrence
ATTORNEYS

United States Patent Office 2,834,088
Patented May 13, 1958

2,834,088

COMBINED MOLD AND RACK

Buel W. Miller, Oklahoma City, Okla., assignor to Varsity Pre-Cast Seat Company, Inc., a corporation of Oklahoma Application December 16, 1955, Serial No. 553,467

9 Claims. (Cl. 25—118)

This invention relates to combined mold forms and handling and curing racks for use in making pre-cast articles, such as stadium seats.

Concrete stadium seats and other similar articles have been molded in conventional forms, and must be left in the forms for several days to cure before being removed. This practice ties up the forms for long periods, so that they cannot be reused. If quantity production is desired, many forms must be available. The only other alternative is to use a quick setting cement, which is considerably more expensive.

The object of the present invention is to provide a mold mounted in a rack to facilitate handling the mold and permitting quicker removal of the cast article from the mold.

A more specific object is the provision of a mold built into a rack section which interfits with another section to permit reversal of the mold and depositing of the cast article upon the second section, which serves as a curing rack.

Another object is the provision of a mold and rack constructed to permit removal of the article in a green state without damage to the article.

A further object is to provide a mold and rack therefore which serves as transporting means in moving heavy cast articles from a pouring station to a curing station.

Other objects of the invention will become apparent from the following description of one practical embodiment thereof when taken in conjunction with the drawings which accompany, and form part of, this specification.

In the drawings:

Figure 1 is a side elevation of a combined mold and rack constructed in accordance with the principles of the present invention;

Figure 4 is a perspective view of one of the mold end panels; and,

Figure 5 is an enlarged detail showing the construction of the upper rack section and the provision made for inserting cables to lift the green casting from the rack.

Figure 2:
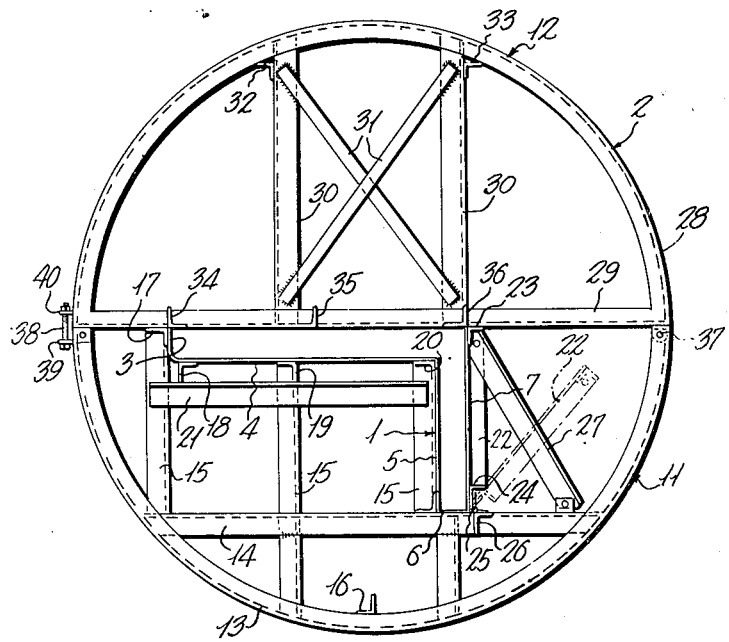
Figure 2 is an end elevation of the device.

In the following description, the invention will be described in connection with a mold for seats such as are used in a stadium, but it will be understood that this is simply an example of its use and the mold may be made in different shapes for making other pre-cast articles.

Referring to the drawings in detail, there is shown a seat mold 1 mounted in the lower half of a two-part rack 2. Each half of the rack is provided with semi-circular channel members, so that when the two parts are joined a series of hoops are formed about the mold to permit the mold and rack to be rolled from place to place. While the lower half of the rack carries the mold, the upper half becomes a rack to support the green casting when the device is rolled 180° and the mold and its attached rack section are removed.

The major portion of the mold is formed from a sheet of metal, bent to desired shape. In the form shown, the mold consists of a vertical flange 3, forming the front edge of the seat, a horizontal flange 4, to define the top surface of the seat, a vertical flange 5, to form the front surface of the seat back, and the horizontal portion 6, to outline the top edge of the seat back. These portions of the mold are made from a continuous sheet of metal. The rear surface of the seat back is defined by a swingable mold plate 7, mounted for pivotal movement relative to the remainder of the mold. The mold parts can be of any length desired.

The ends of the mold are closed by end panels 8, which have the same shape as the cross-section of the mold. The two end panels have peripheral flanges 9 extending at right angles to the end plates, so that they will fit snugly within the ends of the mold. The panels are inserted with the flanges extending outwardly. Clamps 10 are welded to the flanges for securing the end panels in place, as will be described.

As mentioned above, the rack is divided in two sections, the lower section 11 which supports the mold, and the upper section 12 which completes the circular formation and forms a curing rack for the molded article.

The lower rack section is formed of a plurality of semi-circular hoop sections 13, which are arranged vertically in parallel spaced relation along the length of the device. The sections are positioned transversely of the rack, and their ends tie in the same horizontal plane when the rack is in position for pouring. Each hoop section is formed of channel iron, and a channel iron brace 14 extends chordally across it near the bottom, parallel to the plane of the ends. Any number of angle members 15 are arranged vertically and welded to the hoop section and the horizontal brace to complete each transverse frame.

The transverse frames are connected by means of longitudinal angle members in order to tie the assembly together. One of these, 16, is positioned at the bottom center of the rack. Another 17 is positioned at the top of one of the end vertical members with its vertical flange in the plane of the ends of the hoop sections. The member 17 is at the edge of the mold, adjacent the vertical flange 3. Three more longitudinal members, 18, 19 and 20, extend beneath the horizontal flange 4 and support the major portion of the weight of the mold. The members 18, 19 and 20, in turn, are supported upon horizontal members 21 extending across the vertical frame members 15.

The mold 1 rests upon the angle members 19, 18 and 20 and extends the full length of the rack to project slightly beyond the end hoop sections. The front edge of the mold is against the angle member 17, and the pivoted rear wall of the mold is stiffened by vertical braces 22. Longitudinal members 23 and 24 at the top and bottom provide complete rigidity for the mold plate. A hinge 25 connects the bottom member 24 to another longitudinally extending angle iron 26 carried by the cross channel 14. Thus, the mold plate may swing away from the mold when necessary. Locking bars 27, in sufficient number to hold the mold plate in position, are releasably connected to the vertical braces 22 and the channel members 14. These will hold the mold plate locked in upright position for molding.

The upper half of the rack also contains a plurality of semi-circular hoop sections 28, equal in number to the lower half and positioned directly above those of the lower half. Each of these hoop sections is bridged by a channel 29. Vertical angle members 30 extend from channel 29 to the base of the hoop sections and are stiffened by cross-braces 31. The hoop frames are joined by longitudinal angle members 32 and 33 at the top and 34, 35 and 36 at the bottom. The latter group are placed so that their horizontal flanges are in the plane of separation between the two rack sections and thereby extend across the top of the mold when the rack sections are together.

The upper and lower rack sections are joined along one side by pins 37 which hingedly connect the sections for relative pivotal movement. The pins can be withdrawn to completely separate the sections. Along the opposite side, the rack sections are secured together by draw bolts 38, extending between the brackets 39 and 40 welded to the respective sections of the rack. This permits the rack sections to be drawn tightly together.

The longitudinal angle members 34, 35 and 36 are cut out adjacent the hoop sections to form notches 41. The notches extend part way up the vertical flange of each member and the complete width of the horizontal flange. The purpose of these notches will be explained later.

In using the mold and rack, the lower rack section is set up at the pouring station. The end panels are put in place and the clamps fastened over the edges of the mold. Wire mesh or reinforcing rods, or both, are positioned in the mold and the concrete poured. The mold will be filled level with the top. The upper section is then swung on its pivots 37 to overlie the lower section, and clamped to it by means of the draw bolts 38. The concrete is allowed to set for about six hours while the form is in this position.

Figure 3:
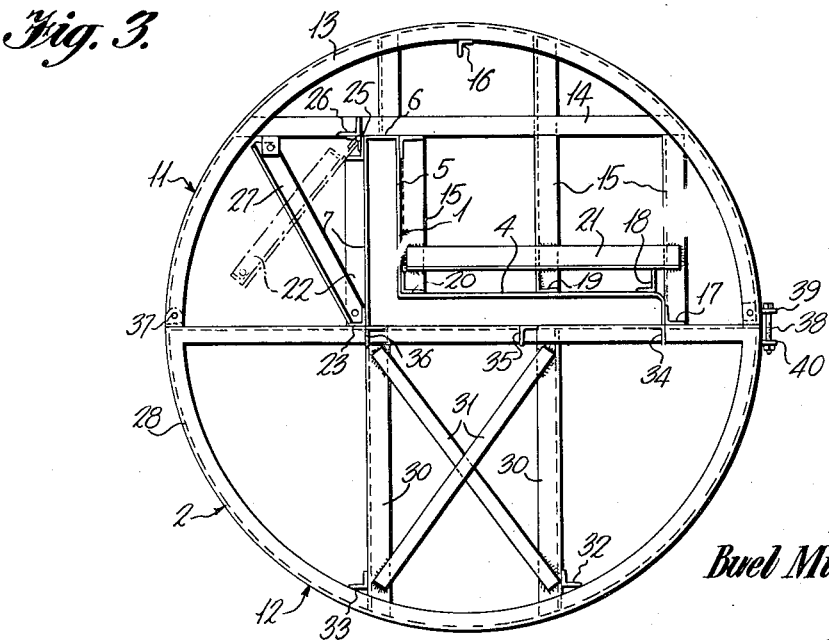
Figure 3 is a view similar to Figure 2 but with the device rotated 180°.

After the initial setting period, the form is rolled on the hoops to a curing station and left in inverted position, as shown in Figure 3. The draw bolts are then released, the pins 37 withdrawn and the locking bars 27 unfastened so that the mold plate 7 is free to move. The lower half of the rack, which is now on top is then lifted off, leaving the cast article supported on the longitudinal angle members 34, 35 and 36. The form will be left approximately six hours longer in this condition for further curing. After this period, cables may be inserted transversely of the form, beneath the cast article, through the notches 41. As the notches are cut completely through the horizontal flanges of the angle members 34, 35 and 36 the cast article can be lifted free of the rack and deposited on a curing line for the remaining curing period.

The mold and rack of the present invention greatly facilitates handling of the green cast article, and cuts down materially on the time the mold is out of use after pouring. When the rack is separated, the half carrying the mold is free for cleaning and re-use immediately. The construction of the upper half of the rack permits removal of the article much sooner than is possible with ordinary molds.

While in the above one practical embodiment of the invention has been disclosed, it will be understood that the structure shown and described is merely by way of example and the invention may take other forms within the scope of the appended claims.

What is claimed is:

1. In a combined mold and rack therefor, a mold having an open top, a two-part rack with each part having semi-circular hoop members, said mold being mounted in one of said rack parts with the open top of said mold in the plane of separation of said rack parts, means carried by the other of said rack parts at the plane of separation of said rack parts to support articles cast in said mold when said rack is inverted, and means to secure said rack parts together.

2. In a combined mold and rack therefor as claimed in claim 1, said means for securing said rack parts together including a separable hinge joining said parts along one side, and means for drawing said parts together along the other side.

3. In a combined mold and rack therefor, a mold having an open top, a rack of two separable sections with each section being semi-circular in cross-section, said mold being mounted in one of said sections with the open top in the plane of separation of said rack, means carried by the other section at the plane of separation to support articles cast in said mold when said rack is inverted, and means to secure said rack sections together.

4. In a combined mold and rack therefor as claimed in claim 3, each of said rack sections comprising a plurality of transversely positioned, longitudinally spaced semi-circular frames joined by longitudinally extending frame members.

5. In a combined mold and rack therefor as claimed in claim 4, some of said longitudinally extending frame members of one of said sections supporting said mold, and some of said longitudinally extending frame members of the other of said sections forming the means to support said cast article when the rack is inverted.

6. In a combined mold and rack therefor as claimed in claim 3, said mold having sides and bottom and open ends, and end panels having outlines conforming to the cross-sectional shape of said mold, and means for securing said end panels to said mold.

7. In a combined mold and rack therefor as claimed in claim 6, said mold having one side pivotally connected to the remainder of the mold, and means to lock said pivoted side in closed position.

8. In a combined mold and rack therefor as claimed in claim 3, said means to support cast articles when the rack is inverted having means to permit the insertion of cables beneath said cast article whereby the cast article may be lifted from the support.

9. In a combined mold and rack therefor, a rack of generally cylindrical overall shape composed of two separable sections meeting along a diametral plane, a mold carried by one of the rack sections and having one open side, the plane of the open side being coincident with the diametral meeting plane of the rack sections, means carried by the other rack section at the diametral meeting plane of the rack sections and traversing the open face of the mold when the rack sections are together to support articles cast in the mold when the mold is inverted, and means to releasably secure the rack section together.

References Cited in the file of this patent

UNITED STATES PATENTS

| | | |
|---|---|---|
| 1,124,164 | Morris | Jan. 5, 1915 |
| 2,596,052 | Stockmar | May 6, 1952 |
| 2,682,696 | Milliken | July 6, 1954 |